United States Patent [19]

Hart

[11] 3,720,117

[45] March 13, 1973

[54] COMPACT VOICE UNIT

[75] Inventor: William Hart, Torrance, Calif.

[73] Assignee: Mattel, Inc., Hawthorne, Calif.

[22] Filed: Jan. 14, 1971

[21] Appl. No.: 106,547

Related U.S. Application Data

[62] Division of Ser. No. 863,450, Oct. 3, 1969, abandoned.

[52] U.S. Cl. .......................... 74/798, 74/199, 74/216

[51] Int. Cl. ...... F16h 13/06, F16h 15/68, F16h 55/34

[58] Field of Search ................. 74/798, 199, 214–216

[56] References Cited

UNITED STATES PATENTS

| | | | |
|---|---|---|---|
| 2,915,907 | 12/1959 | Giskes | 74/216 |
| 2,293,407 | 8/1942 | Schirrmeister | 74/798 |
| 3,133,449 | 5/1964 | Van Antwerp et al. | 74/216 |

FOREIGN PATENTS OR APPLICATIONS

| | | | |
|---|---|---|---|
| 554,491 | 1/1960 | Belgium | 74/215 |
| 939,982 | 11/1948 | France | 74/16 |

*Primary Examiner*—Arthur T. McKeon
*Attorney*—Seymour A. Scholnick

[57] ABSTRACT

A compact and simplified toy phonograph of a type which includes a constant force spring that drives a record turntable, the turntable driving a governor through a planetary drive. The planetary drive includes three planetary discs of elastomeric material, each disc having slots arranged in a circle near its rim to increase its flexibility, to thereby allow greater production tolerances in producing the drive. The spring has a coiled inner portion which is held in a small chamber in the unit housing, to eliminate the need for a pivotally mounted spring-holding hub. The outer end of the spring is attached to the turntable by a tab formed in the spring which is firmly captured by a protuberance on a pair of walls of the turntable.

5 Claims, 15 Drawing Figures

FIG. 1
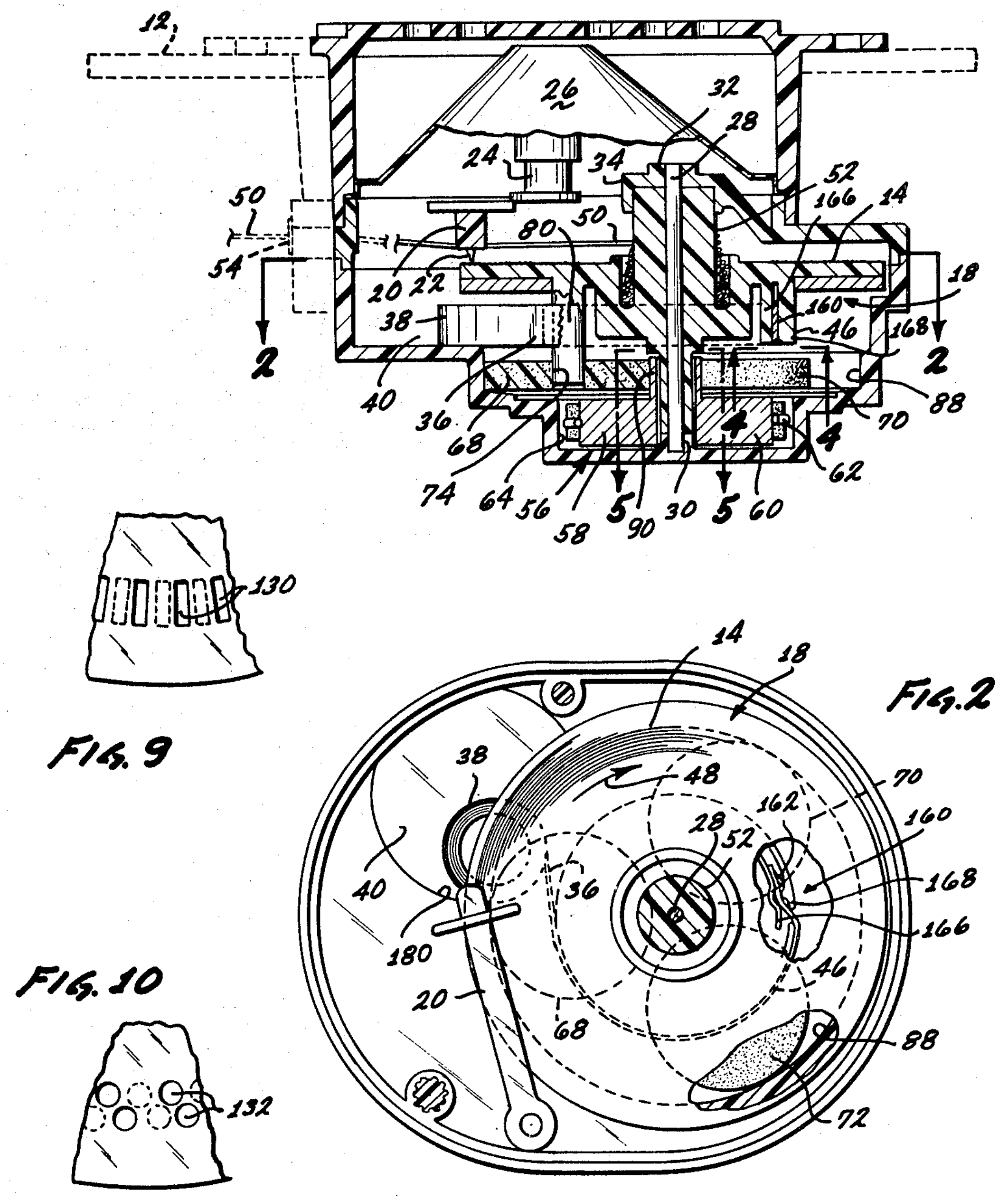
FIG. 1, FIG. 2, FIG. 9, FIG. 10
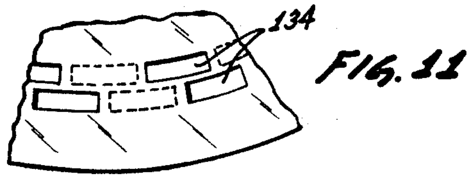
FIG. 11
INVENTOR
WILLIAM HART
BY Max E. Shirk
ATTORNEY

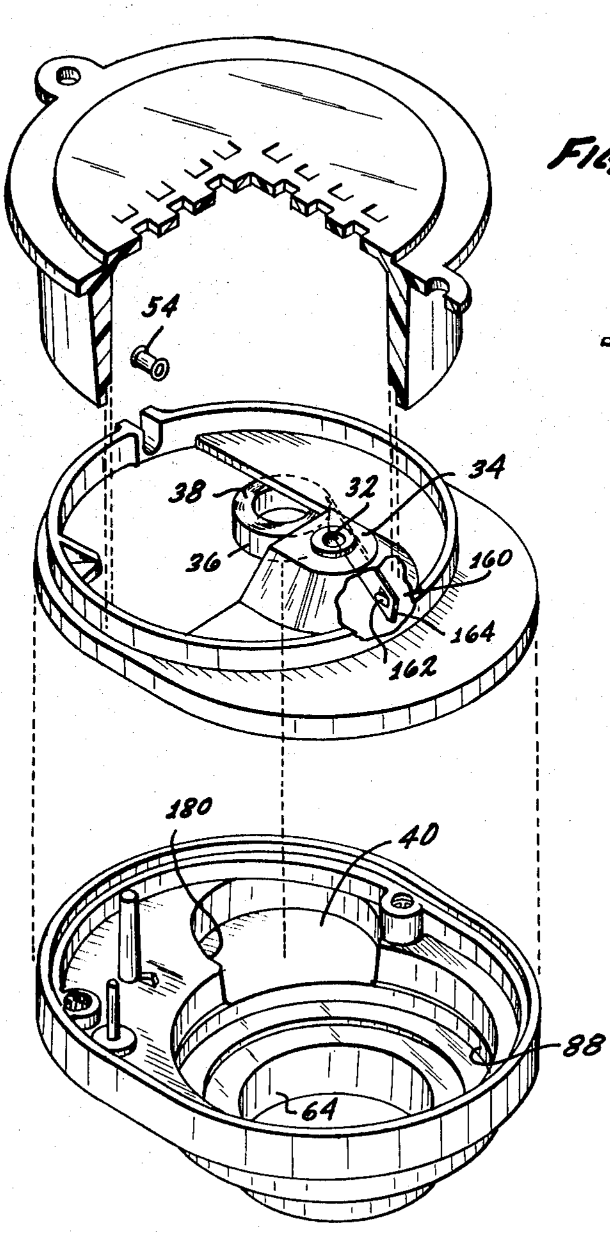
FIG. 3
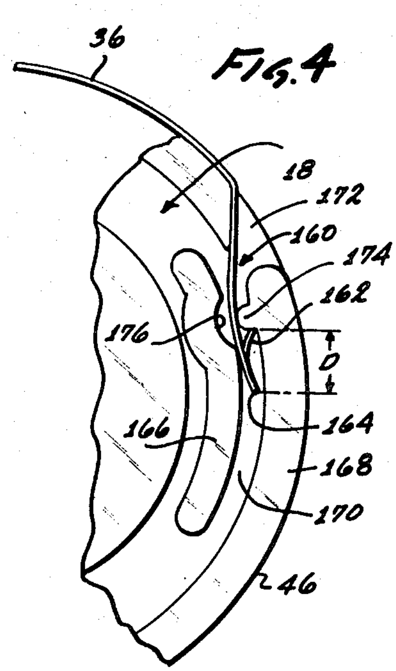
FIG. 4
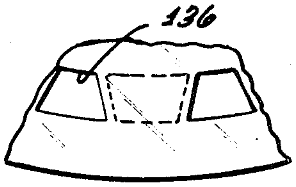
FIG. 12
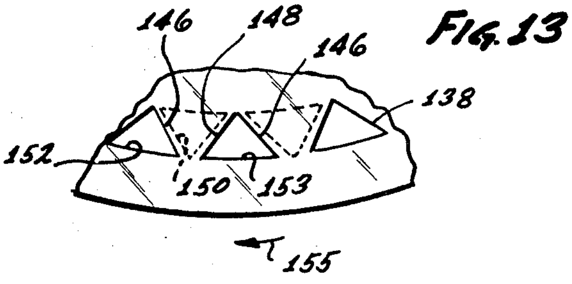
INVENTOR
WILLIAM HART
BY Max E. Shirk
ATTORNEY

INVENTOR
WILLIAM HART

BY [signature]

ATTORNEY

COMPACT VOICE UNIT

CROSS REFERENCE TO RELATED APPLICATION

This application is a division of my application Ser. No. 863,450, filed Oct. 3, 1969, now abandoned, for COMPACT VOICE UNIT.

BACKGROUND OF THE INVENTION

1. Field of the Invention

This invention relates to motor driven toys.

2. Description of the Prior Art

Dolls and other toys are sometimes equipped with motor driven devices such as phonographs for playing short sayings. The phonograph generally includes a record turntable driven by a spring, the turntable driving a governor to maintain a constant turntable speed. The voice units are preferably made as compact as possible to permit their use in small doll bodies. However, the voice units must be of simple design to permit their use in low cost dolls.

One type of voice unit employs a spring which can be wound off a coil and onto a portion of a record turntable. During playing of the phonograph, the spring unwinds from the turntable back to its coil. The coiled inner end of the spring has generally been held on a drum that was pivotally mounted on the voice unit housing at a position spaced from the turntable, to prevent interference between them. The outer end of the spring generally had a hole that received a pin on the turntable to hold it thereon. A simpler and more compact spring drive could lower the cost of the voice unit and decrease its size.

The use of a planetary drive to couple the turntable to a governor decreases the size of the unit. In one planetary drive, several elastomeric discs are rotatably mounted on the turntable, the rim of each disc being engaged with an outer raceway and with the hub of the governor to drive the hub. It generally has been necessary to produce the discs, raceway, and governor hub with close tolerances so that the discs are slightly compressed between the hub and raceway, but are not compressed so much as to substantially increase frictional drag. A construction of the planetary drive that enabled the use of discs with greater tolerances could further lower the cost of the voice units.

OBJECTS AND SUMMARY OF THE INVENTION

An object of the present invention is to provide a compact and economical voice unit.

Another object is to provide a spring drive for a toy which is simple and compact.

Yet another object of the invention is to provide a transmission for coupling a toy phonograph turntable or other slowly rotating member to a governor, which operates well with larger manufacturing tolerances than has been possible heretofore.

In accordance with the present invention, a simple and compact voice unit or other toy is provided which includes a spring-driven slow wheel such as a phonograph turntable, and a governor that is driven at a speed greater than that of the slow wheel to regulate its speed. In one embodiment of the invention, the spring has a coiled inner portion whose outer coil is held by walls of the voice unit housing, to eliminate the need for a pivotally mounted hub to hold the inner portion of the spring. The spring-abutting walls of the housing are constructed so that the coiled inner portion lies adjacent to the portion of the turntable which receives the spring, to provide a more compact voice unit and to more efficiently utilize a given length of spring. The outer end of the spring, which has a tab formed therein, can be held between a pair of walls formed on the turntable. The walls form a slot for receiving the extreme outer end of the spring, and one wall has a protuberance that engages the tab to prevent withdrawal of the spring.

In the foregoing embodiment of the invention, the governor is driven by a planetary mechanism that includes several elastomeric discs rotatably mounted on the turntable. The edges of the discs contact a large stationary raceway that surrounds them and a central hub of the governor, the discs being slightly compressed between the raceway and governor to assure good contact with them. The discs are constructed with slots arranged in a circle near the rims of the discs. The slots increase the flexibility of each disc in a radial direction, so it can be easily compressed between the raceway and hub. This enables the use of larger production tolerances in constructing the raceway, discs, and governor hub.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a toy phonograph constructed in accordance with the invention;

FIG. 2 is a view taken on the line 2—2 of FIG. 1;

FIG. 3 is a partial exploded view of the phonograph of FIG. 1;

FIG. 4 is a partial view taken on the line 4—4 of FIG. 1;

FIG. 9 is a partial plan view of a planetary disc constructed in accordance with a second embodiment of the invention;

FIG. 10 is a partial plan view of a planetary disc constructed in accordance with a third embodiment of the invention;

FIG. 11 is a partial plan view of a planetary disc constructed in accordance with a fourth embodiment of the invention;

FIG. 12 is a partial plan view of a planetary disc constructed in accordance with a fifth embodiment of the invention;

FIG. 13 is a partial plan view of a planetary disc constructed in accordance with a sixth embodiment of the invention;

DESCRIPTION OF THE PREFERRED EMBODIMENTS

Figure 5:
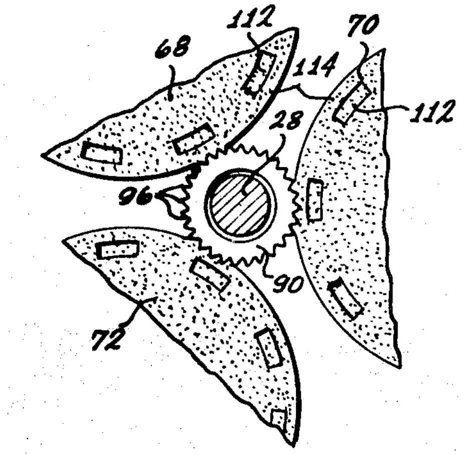
FIG. 5 is a view taken on the line 5—5 of FIG. 1.

FIG. 1 illustrates a voice unit for a toy phonograph 10 constructed in accordance with the invention, shown mounted on a doll housing 12. The phonograph includes a record portion 14 formed in a wheel or turntable 18, the record having several parallel spiral record grooves therein that define different sound recordings. A tone arm 20 is provided which has a needle 22 engaged with one of the spiral grooves to play the record. The tone arm bears against an armature 24 of a speaker cone 26 that acoustically amplifies the sound.

The turntable 18 is fixed to a shaft 28 that is rotatably engaged at one end with a unit housing bearing 30 and at the other end with a bearing 32 in a cover plate 34. Power for rotating the turntable during playing is provided by a spring 36. As also shown in FIG. 2, the spring tends to form into a coil 38 that is held within a chamber 40 of the unit housing. Prior to playing the record, the spring must be wound off the coil 38 and around a cylinder portion, or annular spring receiving portion 46 of the turntable. The spring then rotates the turntable in the direction of arrow 48 to play the record while the spring is rewound on the coil 38.

The winding of the spring on the cylinder portion 46 of the turntable is accomplished when a child pulls on a string 50 whose inner end has many turns around a drum portion 52 of the turntable. Pulling on the string turns the turntable to unwind the string therefrom and to wind the spring 36 thereon. The string extends through a hold in the tone arm 20 to move the needle to the other edge of the record as the string is pulled. The string also extends through an eyelet 54 in the housing and through a hole in the doll or other toy to permit a child to grasp it. As soon as the child has pulled the string, he releases it to allow the spring to turn the turntable and play the record.

In order to assure constant slow rotation, such as three revolutions per second, of the turntable 18 by the spring, a governor 56 is employed which is coupled to the turntable. The governor is rotatably mounted on the shaft 28 which supports the turntable. The governor has a pair of weights 58, 60 which are held in by a spring 62, but which fly out by centrifugal forces when the governor reaches a high speed. When the weights fly out, they bear against the governor raceway surface 64, producing friction that slows the governor.

The turntable is coupled to the governor by a planetary drive that includes three planetary disc members 68, 70 and 72 constructed of elastomeric material. Each disc has a central aperture 74 engaged with a short shaft projection or trunnion 80 on the turntable. A planetary raceway surface 88 engages the outer surface of the three discs to rotate them at a higher speed than the turntable when the turntable rotates. The governor 56 has a hub portion 90 which is engaged with the perimeter portions of the three planetary discs. As the turntable rotates, causing the planetary discs to rotate somewhat faster, the discs drive the governor 56 at a relatively high speed, such as ten times the turntable speed.

Good frictional engagement between the planetary discs and both the planetary raceway 88 and governor hub portion 90 is promoted by the use of a relatively soft resilient or elastomeric material such as fifty shore hardness rubber or vinyl. In addition, the hub 90 is provided with knurls or protuberances 96, as shown in FIG. 5. The discs must bear with appreciable force against the raceway and hub. To this end, the diameter of the discs is slightly greater than the difference in radius between the raceway 88 and hub portion 90, which causes the discs to become compressed slightly. The aperture 74 of the discs are made large enough so that even with slight deformation and shifting, the discs rotate freely on the turntable trunnions.

The manufacturing tolerances used in constructing the transmission portion of the voice unit, particularly those for the portion which forms the planetary raceway 88, is relatively small. If the distance between the raceway 88 and hub 90 is too large, the disc will not firmly engage the raceway and hub and will not transmit power to drive the hub. If the radial distance between the raceway and hub is too small, the planetary discs will have to be compressed substantially, resulting in large frictional losses. In addition, the central hole 74 of each disc will be deformed into an oval shape, causing large frictional losses between the walls of holes 74 and the trunnions 80.

Figure 8:
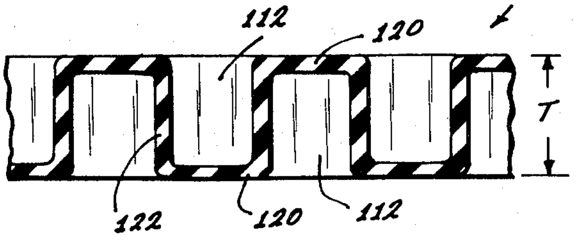
FIG. 8 is a view taken on the line 8—8 of FIG. 6.

In accordance with the invention, the planetary discs 68, 70, 72 are constructed to provide large radial flexibility, so that they can function well for a large range of radial distances between the planetary raceway 88 and hub 90. As shown in FIGS. 5–8 for disc 68, the disc has slot-like recesses 112 spaced a small distance from the rim 114 and extending axially into the disc. The slots reduce the cross-section of the disc near the rim, to facilitate radial compression of the disc between a pair of elements such as the hub 90 and raceway 116. As shown in FIG. 8, the cross-section of the disc at the slots, taken perpendicular to a radius from the center of the disc, is reduced to a small fraction of the disc cross-section at a location immediately radially inward from the slots, so the disc can be easily compressed. Slots are formed in each face of the disc and each slot extends only part of the way through the thickness T of the disc, so that webs 120 remain at opposite faces of the disc. The slots which extend into opposite faces are staggered along an imaginary circle C which is concentric with the central hole 74 in the disc, and the slots are spaced from each other to leave axially extending webs 122 between adjacent slots. The webs 120 at the faces and the axially extending webs 122 reduce the tendancy for the rim portion to "fold over" or collapse in an unpredictable manner instead of simply compressing.

If a disc is used in a device which is constructed to leave a smaller than normal distance between the hub and planetary raceway, the disc will be compressed considerably. Much of the compression is taken up by the region which has slots upon the application of only a moderate compressing force. The fact that the slots take up much of the compression eliminates large deformation of the central region where the hole 74 is located. If a solid disc were used instead of one with may recesses therein, large compressing forces would have to be applied to deform the disc so it could be received in the reduced space between the hub and raceway. This would result in large frictional losses in rolling the deformed disc. In addition, the central hole would be considerably deformed, so that frictional losses between the walls of central hole 74 and the trunnion 80 on which it is mounted would be considerably greater. Thus, the use of many recesses in the disc keeps frictional losses to a low level even if there are large manufacturing tolerances in constructing the raceway, disc and governor hub.

The use of the slots accomplishes more than could be obtained by merely using a softer rubber with a solid disc that had no recesses. The use of soft rubber could easily lead to warping of the disc, and it would also allow large deformation of the central hole 124 and the accompanying increase in friction. Because of the use of harder rubber, the recesses are preferably spaced from the rim of the disc by a small distance P which is less than the disc thickness T, so that the material between the recesses and rim can be easily deformed.

In order to obtain high flexibility, the slots 112 should be wide and deep to leave webs 120 and 122 which are only a small fraction of the disc thickness, preferably less than one-fourth of it. Such slots leave only a small remaining area of elastomeric material, preferably less than one-fourth the cross-section which the disc would have without the slots. Slots which are substantially square in cross-section, as shown in FIG. 8, leave the webs 120 and 122 of approximately equal length. The provision of webs 120 and 122 of equal length makes the most efficient use of the web portions that are left, to encourage simple compression by preventing folding over or collapse of the slotted portion of the disc.

Discs with recesses of the type illustrated in FIGS. 5–8 have been constructed, and they have been found to provide less frictional losses than solid discs, even for transmissions built to tolerances appropriate to solid discs. The reduction in friction is believed to be due primarily to the reduction of deformation of the central hole 124 and to reduction in the amount of force required to flex the discs. Of course, the slotted discs also allow for the use of larger manufacturing tolerances.

Figure 15:
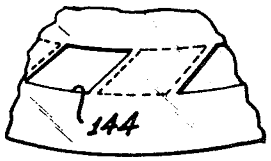
FIG. 15 is a partial plan view of a planetary disc constructed in accordance with an eighth embodiment of the invention.
Figure 14:
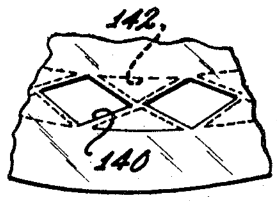
FIG. 14 is a partial plan view of a planetary disc constructed in accordance with a seventh embodiment of the invention.
Figure 6:
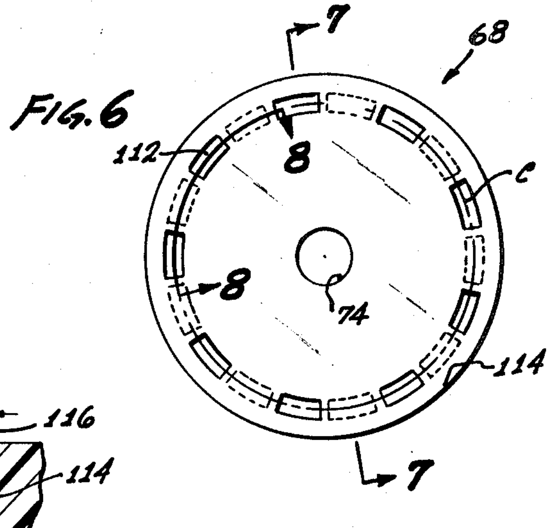
FIG. 6 is a plan view of a planetary disc constructed in accordance with one embodiment of the invention.
Figure 7:
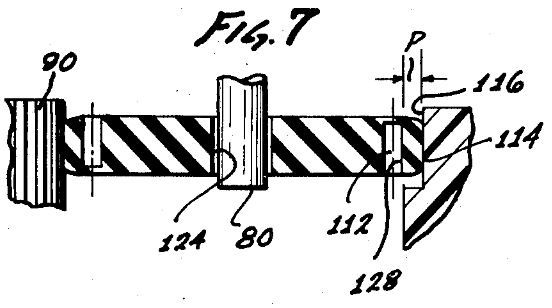
FIG. 7 is a view taken on the line 7—7 of FIG. 6.

FIGS. 9–15 illustrate several different forms of recesses which can be utilized for the discs. In FIG. 9, recesses 130 are utilized which are elongated in a radial direction. FIG. 10 illustrates a disc with two radially spaced rows of recesses 132, the recesses of each row being formed alternately in opposite sides of the disc. FIG. 11 illustrates a disc with two rows of rectangular recesses 134 which are elongated in a circumferential direction. FIG. 12 illustrates a disc with trapezoidal recesses 136. FIG. 13 illustrates a disc with triangular shaped recess 138. FIG. 14 illustrates a disc with diamond shaped recesses 140 on one side and triangular recesses 142 on the opposite sides, two triangular recesses being positioned between each pair of diamond shaped recesses. FIG. 15 illustrates a disc with parallelogram shaped recesses 144 wherein two of the four sides of each recess extend circumferentially, but the other sides do not extend radially, and wherein identically shaped recesses are staggered on opposite sides of the disc.

Of the various forms of recesses illustrated, special note may be taken of those in FIGS. 13 and 14. In these discs, webs are left between adjacent recesses which are inclined between 0° and 90° to a radius. Thus, a pair of webs 146, 148 is left between a recess 150 on one side of the disc and a pair of recesses 152, 153 on the opposite side. The webs 146, 148 each extend about 45° with a radius, but in opposite directions, with web 146 extending at less than 90° to one direction of rotation indicated by arrow 155, and with web 148 extending at more than 90° to that direction of rotation. The webs 146, 148 tend to assure controlled, gradual deformation for forces applied at any angle. Thus, even if the collapsing force applied to the disc is not exactly radial, as when it is compressed during installation, the geometry of the disc after deformation is better controlled.

Referring again to FIGS. 1–4, the spring 36 has an outer end portion 160 which is fastened to the turntable 18 in a manner that allows simple and economical installation. As shown in FIGS. 3 and 4, the outer end portion 160 of the spring has a tab 162 formed therein at a small distance D from the extreme outer tip 164 of the spring. The turntable has a pair of walls 166, 168 that form a slot 170 between them for receiving the outer spring end portion 160. The outer wall 168 of the slot has an outer surface that forms the annular spring receiving portion 46 around which the spring is wound. The wall 160 also has a radially directed opening 172 to permit the radial passage of the spring 36 between the outside of the wall 168 and the slot region 170. A protuberance 174 formed on the inside of wall 168 extends into the slot to abut the tab 162, to capture the outer end of the spring in the slot.

The spring is prepared for installation by lancing the end portion 160 to form the tab 162, the innermost portion of the tab being punched out of the surrounding spring area. The lancing operation can be performed at the same time as a roll of spring material is cut to provide the length of material needed to form the spring 36. The tab 162 is formed so that it extends in a direction toward the inner end of the spring. The installation of the outer end portion 160 is accomplished by holding the spring so that the extreme tip 164 faces upwardly while the turntable is horizontal. The end 160 is then inserted through the open lower side of the slot 170, and the spring is turned 90° so that it lays in the position shown in FIG. 4. The depth of the slot 170 should be at least about the length D between the extreme outer tip of the spring and the inner end of the tab, to allow the tab to be fully received in the slot before the spring is turned 90°. After turning the spring 90°, the tab 162 is trapped behind protuberance 174. In order to allow the spring to extend more easily around the protuberance, a small recess 176 is provided in wall 166 opposite the protuberance.

The coil 38 of the spring material is maintained in chamber 40 without the use of a drum or other means for directly pivotally coupling it to the housing of the voice unit. When the spring is even partially wound on the spring receiving portion 46 of the turntable, the coiled inner portion of the spring bears against the spring holding wall portion 180 of the chamber, and moves close to the spring receiving portion 46 of the turntable. The coiled portion is free of sideward restraints, so it can move against and away from the wall portion 180 and the spring receiving portion 46, of the turntable or any turns of the spring already wound thereon. Thus, the coil is trapped in position without the complications of a direct pivotal mounting. When the spring unwinds from the turntable and onto the coil 38, there is a low enough friction between the surface of the spring and the chamber walls to allow the spring to readily rewind.

The location of the coiled inner portion 38 adjacent to the spring receiving portion 46 of the turntable allows for efficient use of the length of the spring, inasmuch as only a limited portion, of the spring extends in a straight line between the coil 38 and spring receiving portion 46 of the turntable. If the spring were mounted further away from the turntable, the extra length of spring extending between the coil and turntable would be wasted. The closer mounting of the spring to the turntable also allows for a more compact voice unit. In this invention, the spring receiving chamber 40 is disposed under the loud speaker 26, when the speaker cone is facing upwardly (the cone may be turned upside down, and it will still direct its sound in an upward direction and therefore be facing upwardly). Thus, the space required for the large loud speaker cone 26 is more efficiently utilized to obtain a smaller voice unit.

Thus, the invention provides a simple, compact, and economical voice unit. The construction allows for larger manufacturing tolerances by the use of planetary discs in the transmission between the turntable and the governor, which have recesses near their rims that increase their radial flexibility. The spring which drives the turntable has an outer end which is formed with a tab thereon that can be received between a pair of walls on the turntable to permit rapid and secure installation of the outer end of the spring. The coil in which the spring tends to be retained is free of direct pivotal coupling to the housing of the unit, thereby eliminating the complexities and added expense of a pivotally mounted spring receiving drum. Instead, the spring is held in a space close to the turntable, and it bears against the walls of a chamber near the turntable and the spring receiving portion of the turntable. This allows the spring coil to be held in a more compact unit and permits a more efficient use of the length of the spring. In addition, the spring can be held beneath the speaker cone of the unit to further aid in compaction of the unit.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a toy, a pair of movable elements, an idler member loosely rotatably mounted on a shaft between said elements and which is compressed between said elements, the improvement comprising:

said idler member being constructed of elastomeric material with a hole at its center loosely rotatably mounted on said shaft and a rim portion engaging said elements, said member having a plurality of recesses formed therein at positions spaced radially inwardly from said rim, said recesses extending only partially through the thickness of said member, some recesses extending from one face of the member and others extending from the opposite face, and wherein recesses extending from opposite faces are staggered along an imaginary circle which is concentric with said hole at the center of said member.

2. The improvement described in claim 1 wherein:

said recesses are constructed so that the webs left between adjacent recesses and the webs left between each recess and the opposite face of the disc are of substantially equal length.

3. The improvement described in claim 1 wherein:

said recesses are constructed to leave a cross-section taken perpendicular to radii from said center, which is less than one-fourth of the cross-sectional area of said member at a position immediately radially inward from the recesses.

4. The improvement described in claim 1 wherein:

said recesses are formed to leave inclined webs extending at between 0° and 90° to an imaginary radius of said idler member, some of said webs extending at less than 90° to a predetermined direction of rotation of said idler member and other webs extending at more than 90° to said direction of rotation.

5. In a toy, a pair of movable elements, an idler member loosely rotatably mounted on a shaft between said elements and which is compressed between said elements, the improvement comprising:

said idler member being constructed of elastomeric material with a hole at its center loosely rotatably mounted on said shaft and a rim portion engaging said elements, said member having a plurality of recesses formed therein at positions spaced radially inwardly from said rim, said recesses extending only partially through the thickness of said member, some recesses extending from one face of the member and others extending from the opposite face, and wherein recesses extending from opposite faces are staggered along an imaginary circle which is concentric with said hole at the center of said member, said member being of disc shape, and the radially outermost walls of said recesses being spaced from the rim of said member by less than the thickness of said disc.

* * * * *